(12) United States Patent
Wheals et al.

(10) Patent No.: US 9,068,592 B2
(45) Date of Patent: Jun. 30, 2015

(54) BEARING FOR A WIND TURBINE

(75) Inventors: Jonathan Charles Wheals, Warwickshire (GB); Pierre Marc Guern, Warwickshire (GB)

(73) Assignee: Ricardo UK Ltd., West Sussex (GB)

( * ) Notice: Subject to any disclaimer, the term of this patent is extended or adjusted under 35 U.S.C. 154(b) by 0 days.

(21) Appl. No.: 14/002,282

(22) PCT Filed: Feb. 29, 2012

(86) PCT No.: PCT/GB2012/050451
§ 371 (c)(1),
(2), (4) Date: Oct. 31, 2013

(87) PCT Pub. No.: WO2012/117243
PCT Pub. Date: Sep. 7, 2012

(65) Prior Publication Data
US 2014/0050435 A1 Feb. 20, 2014

(30) Foreign Application Priority Data
Mar. 3, 2011 (GB) .................................. 1103694.4

(51) Int. Cl.
*F16C 27/00* (2006.01)
*F16C 23/00* (2006.01)
*F16C 25/00* (2006.01)
*F16C 19/52* (2006.01)
*F03D 11/00* (2006.01)

(52) U.S. Cl.
CPC ............ *F16C 19/52* (2013.01); *F03D 11/0008* (2013.01); *F05B 2240/60* (2013.01); *F16C 2300/14* (2013.01); *Y02E 10/722* (2013.01)

(58) Field of Classification Search
CPC ...... F03D 11/0008; F16C 19/52; F16C 23/06; F16C 25/06; F16C 2300/14; F05B 2240/60
USPC ........... 384/99, 519, 556, 583, 616, 620, 627; 74/111, 112, 126, 128, 129; 92/12.1, 92/13.4, 14, 15
See application file for complete search history.

(56) References Cited

U.S. PATENT DOCUMENTS 2,010,362 A * 8/1935 Frauenthal et al. ............. 384/99
2,309,077 A * 1/1943 Osgood ........................... 74/111
(Continued)

FOREIGN PATENT DOCUMENTS

| DE | 20 2010 009832 U1 | 9/2010 |
|---|---|---|
| EP | 2 236 845 A2 | 10/2010 |
| JP | 2009-287628 A | 12/2009 |
| WO | WO-2010/035011 A2 | 4/2010 |

OTHER PUBLICATIONS

International Search Report and Written Opinion for Application No. PCT/GB2012/050451; dated Jul. 30, 2012.

*Primary Examiner* — James Pilkington
(74) *Attorney, Agent, or Firm* — Alston & Bird LLP

(57) ABSTRACT

A rotary mechanism for incrementally advancing a rotary element (13) with respect to a ground member (12) comprises a unidirectional clutch (41) and a rotary actuator (21, 33, 39). Actuation of the actuator is against a resilient bias (34), and overcomes friction between the rotary element and the ground member to advance the rotary element with the unidirectional clutch locked. Release of the actuator allows re-setting thereof by the resilient bias, the friction between the rotary element and the ground member resisting further relative movement.

12 Claims, 5 Drawing Sheets

(56) References Cited

U.S. PATENT DOCUMENTS

| | | |
|---|---|---|
| 8,016,487 B2 * | 9/2011 | Salvagione et al. ............. 384/91 |
| 2009/0175724 A1 | 7/2009 | Russ et al. |
| 2009/0232652 A1 | 9/2009 | Keller et al. |
| 2011/0235953 A1 * | 9/2011 | Wheals ......................... 384/100 |
| 2012/0261920 A1 * | 10/2012 | Aso et al. ......................... 290/44 |

* cited by examiner

BEARING FOR A WIND TURBINE

CROSS-REFERENCE TO RELATED APPLICATIONS

The present application is a national stage entry of International Application PCT/GB2012/050451, filed Feb. 29, 2012, which claims benefit from GB 1103694.4, filed Mar. 3, 2011, the disclosure of each of which is incorporated herein in its entirety.

BACKGROUND OF THE INVENTION

This invention relates to a bearing comprising a fixed element and a concentric moving element, and preferably comprises concentric inner and outer races having a plurality of rolling elements therebetween.

WO-A-2010/035011 discloses a bearing for a wind turbine in which the race which is normally fixed with respect to ground is adapted to idle in a controlled manner. Such an arrangement allows the static load to be supported around the entire circumference of the normally fixed race, rather than being taken continuously by the same upward facing portion. As a result bearing life can be substantially enhanced. Various means and methods of generating controlled idle rotation are disclosed. Idle rotation should be sufficiently slow to avoid wear of the bearing, but fast enough to avoid damage caused by sustained static loads.

BRIEF SUMMARY OF THE INVENTION

The present invention discloses an arrangement for moving a bearing race with respect to the component with which the race is normally fixed, for the purpose of avoiding continual application of loads through the same portion of this race.

According to the invention there is provided a rotary mechanism for incrementally advancing a first circular bearing member with respect to a second circular bearing member, the first and second circular members being engaged with resistance to relative angular movement, the rotary mechanism comprising a circular actuator rotationally fixed to the first member and having an output annulus coupled via a unidirectional clutch to the second member, wherein said actuator is adapted to generate a torque sufficient to advance said first member arcuately with respect to the second member in a locked condition of said unidirectional clutch, and said output annulus is adapted to advance relative to said second member on release of said actuator in an unlocked condition of said unidirectional clutch.

One of the circular bearing members is typically a support shaft.

Such an arrangement permits repeated incremental movement to advance a normally static race, being a first circular bearing member, with respect to a ground element, being a second circular bearing member.

Preferably the rotary actuator comprises a plurality of identical hydraulic actuators arranged circumferentially about said annulus. Such an arrangement is space efficient and permits generation of a high torque. The hydraulic actuators, annulus and unidirectional clutch are preferably substantially co-planar, thus being adapted for mounting at the side of a rolling element bearing, or between two spaced rolling element bearings.

Each hydraulic actuator may comprise a piston engaged with said annulus and movable arcuately in a respective chamber defined by an actuator housing, said actuator housing being coupled to said first member. Preferably the actuator housing defines therein a continuous circular passage of constant section, each chamber being constituted by a portion of said passage. The passage is typically rectangular in section, and supports pistons with substantially rectangular cup seals.

In one embodiment the actuator housing defines a plurality of slots at the radially inner side thereof through which respective pistons engage with said annulus. Preferably the circumferential dimension of said slots defines the maximum incremental advance of said mechanism. This arrangement provides a convenient travel stop. In one embodiment the annulus includes a plurality of radial projections for engagement one each in a respective slot.

The rotary actuator is preferably advanced against a return bias which provides the re-setting force thereof. The return bias is preferably provided by a return spring of each piston of each hydraulic actuator.

Preferred features of the invention are mentioned in the claims appended hereto.

BRIEF DESCRIPTION OF THE SEVERAL VIEWS OF THE DRAWINGS

Other features of the invention will be apparent from the following description of a preferred embodiment shown by reference only in the accompanying drawings, in which.

DETAILED DESCRIPTION OF THE INVENTION

Figure 1:
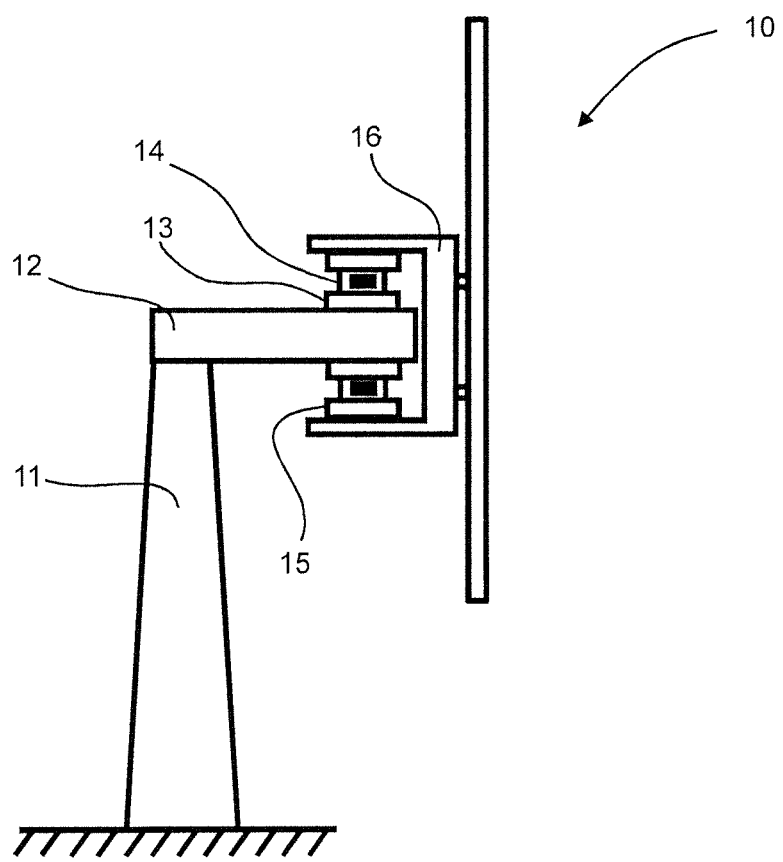
FIG. 1 is a schematic drawing of a wind turbine with certain components enlarged and in section.

With reference to the accompanying drawings, FIG. 1 represents schematically a wind turbine (10) consisting of a mast (11), hub (12), inner bearing race (13), rolling elements (14), outer bearing race (15) and rotor assembly (16).

Conventionally the inner race (13) is fixed against rotation on the hub (12), and the outer race (15) is fixed for rotation with rotor assembly (16). Usually these races (13, 15) are a press fit on the respective components, the intention being to allow only relative rotational movement between the races via the rolling elements (14). In some arrangements the outer race may be fixed relative to the hub, and the inner race provided on the rotor assembly.

Figure 2:
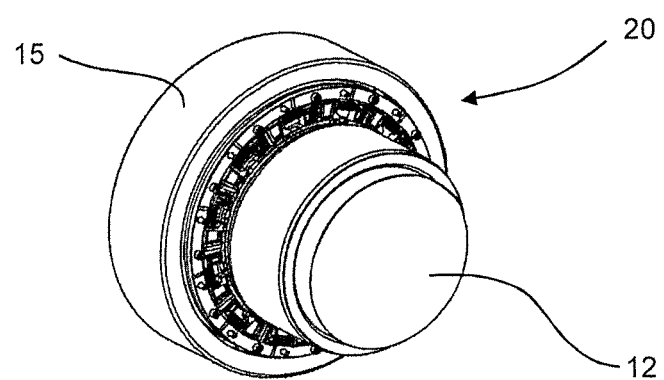
FIG. 2 is a perspective view of a hub assembly incorporating the present invention.

FIG. 2 illustrates the present invention with the hub (12) and outer race (15). An incremental advance mechanism (20)

is provided at one side of the bearing, so that the inner race and rolling elements are hidden. The rotor assembly is not illustrated.

FIGS. 3-11 illustrate the invention in detail. A circular hub (12) carries an inner race (13) of a bearing. The race is assembled to the hub with a fit which normally prevents relative rotational movement, but will permit such movement on application of sufficient rotational force, as will be further described. Such an arrangement is intended to permit incremental advance of this normally grounded race to present successive arcs of the inner race to static and bending loads on the rotor assembly.

The advancing mechanism (20) comprises a housing (21) assembled from facing annular components (22, 23), and which together define an annular chamber (24). The components are fixed together by cap screws (25). The housing (21) has integral circumferentially spaced dogs (26) engageable in corresponding recesses (27) of the inner race so as to render the housing and inner race rotationally fixed.

Within the chamber (24) a succession of equi-spaced piston chambers (31) are defined by respective pairs of pistons (32, 33) normally urged apart by respective coil springs (34). Each piston (32, 33) has a protuberance (35, 36) which locates within one end of a respective spring (34), and respective pairs of protuberances (35, 36) are circumferentially aligned to limit the closing travel thereof.

One piston (33) of each pair (the most clockwise in FIG. 4) has a radially inwardly extending dog (37) engageable within a corresponding pocket (38) in a support ring (39). This ring has a plain circular inner circumference engageable with the radially outer surfaces of elements of a circular sprag assembly (41). The radially inner elements of the sprag assembly (41) engage the hub (12).

Figure 4:
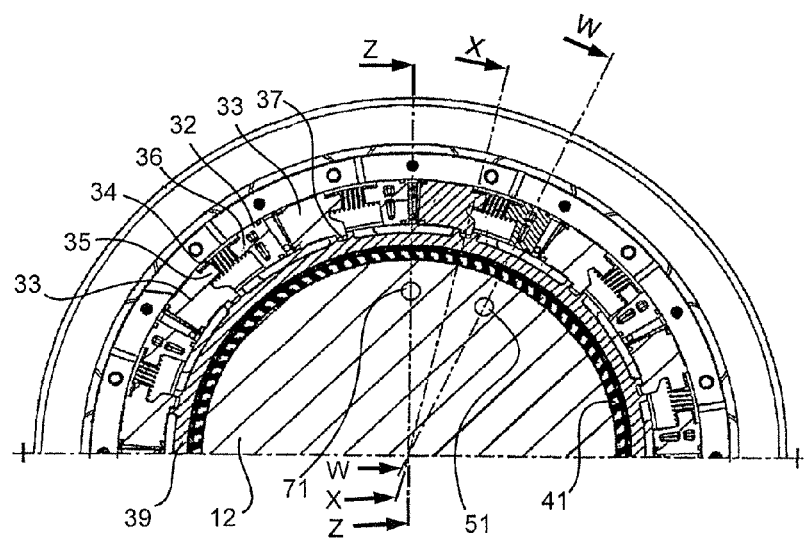
FIG. 4 is a radial section through the assembly of FIG. 3.

Further description of the sprag assembly is not required, since the skilled man will be familiar with the design and function thereof. In use the sprag assembly permits relative rotation in one direction only. With reference to FIG. 4, the sprag assembly permits anti-clockwise rotation of the support ring (39) relative to the hub (12), but locks to prevent relative clockwise rotation of the support ring (39) relative to the hub (12).

The other piston (32) of each pair is fixed with respect to the housing (21) by virtue of axially facing pegs (43) which engage with respective slots (44) of the annular component (22). One peg (43) is provided for each piston (32), but for increased torque capacity a second oppositely facing peg could be provided for each piston and engageable in the other annular component (23).

Each piston incorporates a cup seal (45), as illustrated.

The annular component (22) includes circumferential slots (46) through which pass the pockets (38). The circumferential length of each slot (46) limits relative angular movement of the support ring (39). In the arrangement shown this permissible travel is about 5° of annular movement.

Figure 5:
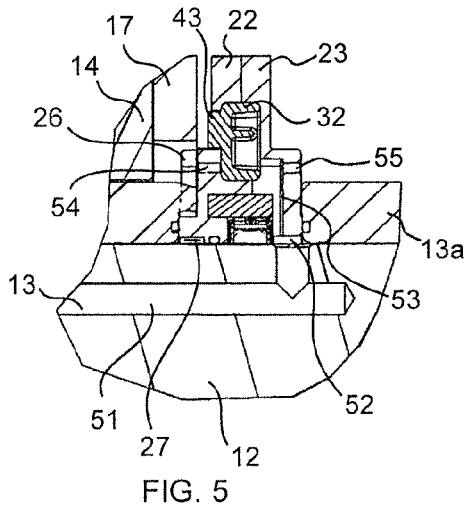
FIG. 5 is a transverse section on line W-W of FIG. 4 at a scale of 2:1.
Figure 6:
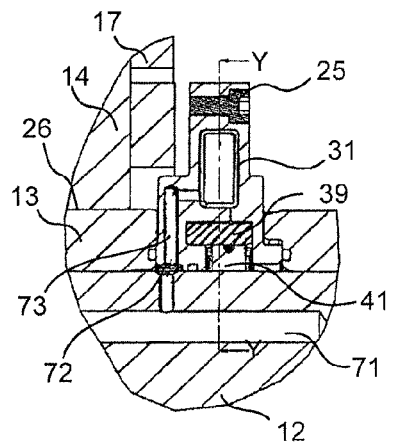
FIG. 6 is a transverse section on line Z-Z of FIG. 4 at a scale of 2:1.
Figure 7:
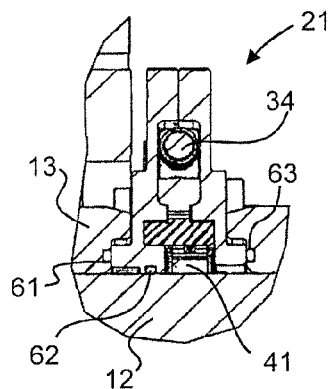
FIG. 7 is a transverse section on line X-X of FIG. 4 at a scale of 2:1.
Figure 12:
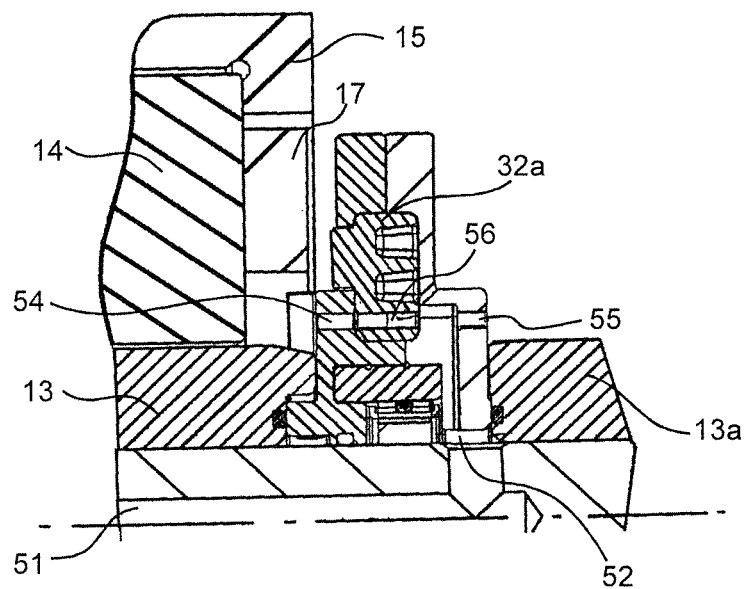
FIG. 12 corresponds to FIG. 5, and illustrates a lubrication path.

The hub (12) includes a lubrication passage (51) (FIG. 5) which opens to the outer circumference. Lubrication oil is distributed via an annular passageway (52) of the annular component (23) to a plurality of radial drillings (53), and then via axial outlets (54, 55) to rolling elements (14) of the bearing. FIGS. 5-7 illustrate an optional second inner race (13a), but omit the rolling elements. A bearing cage (17) spaces the rolling elements (14) equally. Lubrication outlets (54, 55) are connected via an opening (56) in the piston (32) illustrated in FIG. 12; this embodiment shows a modified piston (32a) of different section.

O-ring seals (61, 62, 63) are provided to seal the lubrication path where necessary.

A control pressure passage (71) also feeds to the outer circumference of the hub (12), where it connects with an annular passageway (72) of the annular component (22). Respective radial/axial drillings (73) connect this passageway (72) to each piston chamber (31).

In operational use the inner race (13) is normally rotationally fast with the hub (12) so that relative angular movement is not permitted.

However, on application of a control pressure at passage (71), the piston chambers (31) are pressurized, thus forcing the pistons (32, 33) apart. Movement of pistons (33) relative to the hub (12) is resisted by the sprag assembly by virtue of the dogs (37) which engage closely within corresponding pockets (38). As a consequence the pistons (34) are urged anti-clockwise (FIG. 4) with respect to the hub (12), thus moving the inner race anti-clockwise by virtue of engagement of the dogs (26) in the recesses (27). This relative movement brings a new arc of the inner race into alignment with a vertical load transmitted via the rollers (14).

On release of control pressure, the engagement force between the inner race (13) and the hub (12) is much greater than the drag of the sprag assembly (41), which releases. As a consequence the springs (34) expand, pushing the pistons (32, 33) apart and rotating the support ring (39) relative to the hub (12). In this condition, the components are again at rest, as illustrated in FIG. 4.

Successive control pulses may be applied as often as necessary, based on calculation and observation, so as to increment the inner race to a new angular location before damage occurs to the surface thereof. The embodiment described allows about 5° angular movement per pulse, and it will be understood that several successive pulses may be used to give a periodic incremental movement of say 15°.

The preferred embodiment is adaptable to higher torque applications by enlarging the hydraulic chambers, for example by increasing the axial and/or radial dimension. The permitted arc of movement may be selected according to the length of each slot (46), the projections (35, 36) being adjusted accordingly. A lower torque application may have smaller chambers, or fewer chambers.

Figure 3:
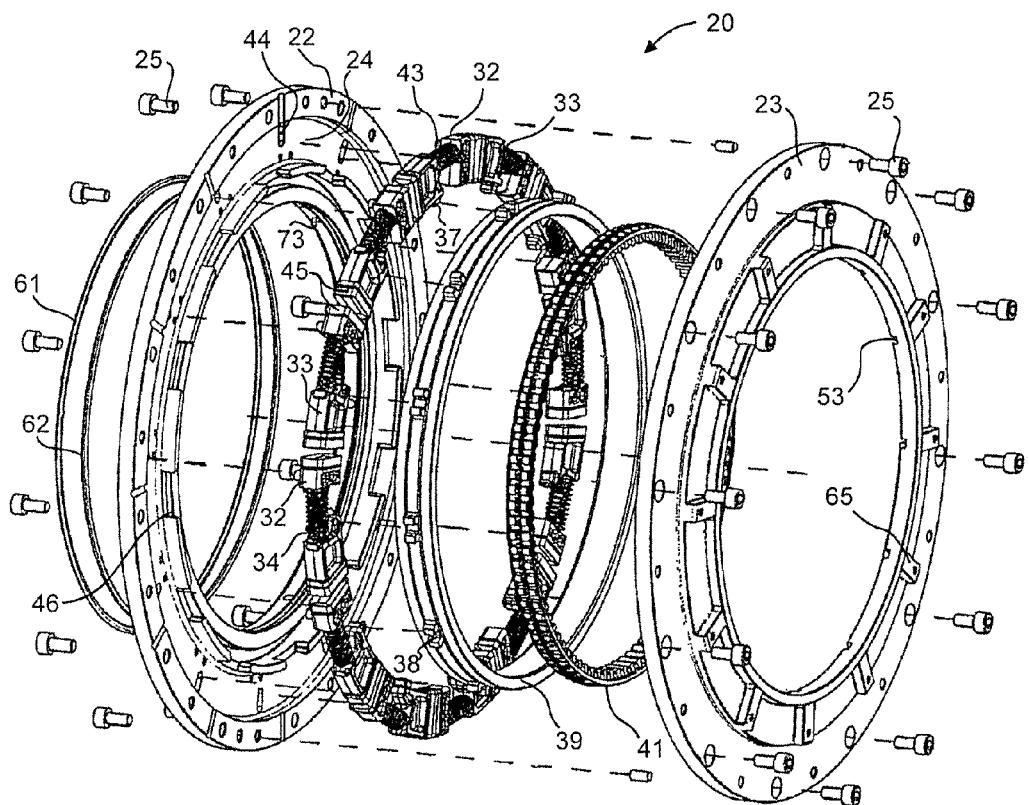
FIG. 3 is an exploded view of an inclining mechanism comprising the invention.
Figure 8:
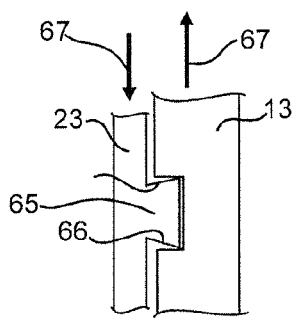
FIG. 8 is an enlarged view of a peg and slot engagement for use in the invention.
Figure 9:
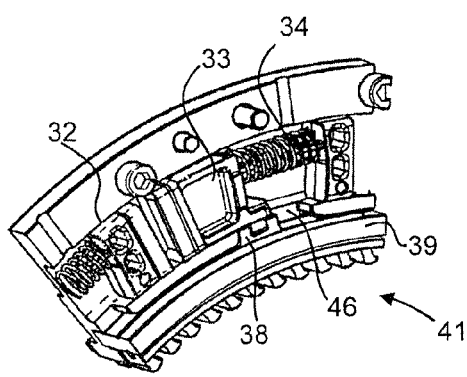
FIGS. 9 and 10 show respectively the rest and advanced conditions of the actuator, on an enlarged scale.
Figure 10:
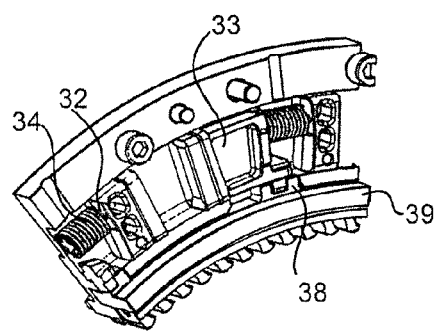
Figure 11:
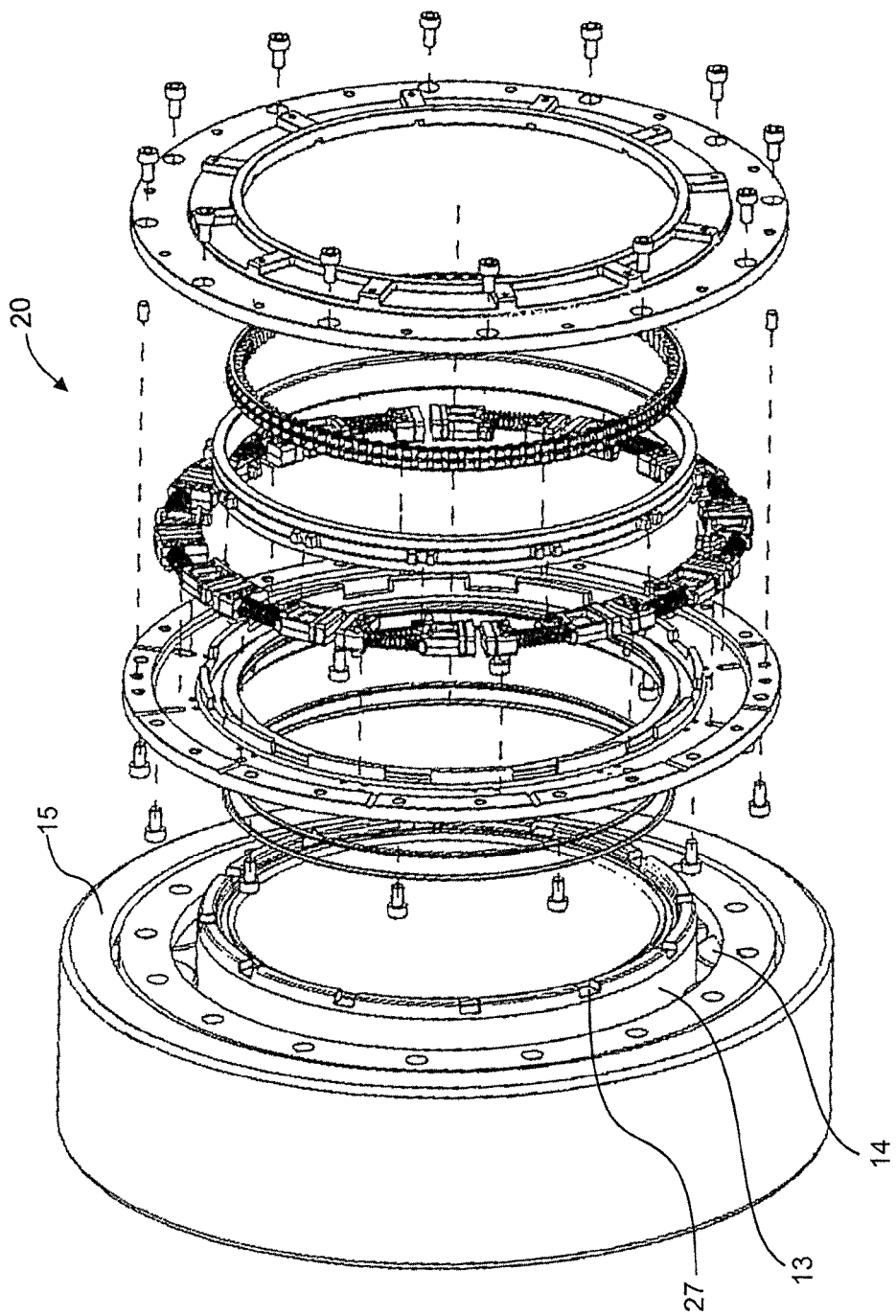
FIG. 11 corresponds to FIG. 2, showing additionally a rolling element bearing.

In the embodiment of FIG. 3, ribs (65) define oil passages (FIG. 5) and may also constitute the means of engagement with the element which is to be advanced. These ribs (65) are equivalent to the ribs (26) (not shown in FIG. 3). Not all of the ribs need be used for this purpose, and three wide equi-spaced ribs may suffice. Those ribs may include a reverse rake (66), as illustrated in FIG. 8 to prevent camming-out of engagement in a respective parallel sided slot of an inner bearing race (13), as a result of relative movement in the directions illustrated by the arrows (67).

Figure 13:
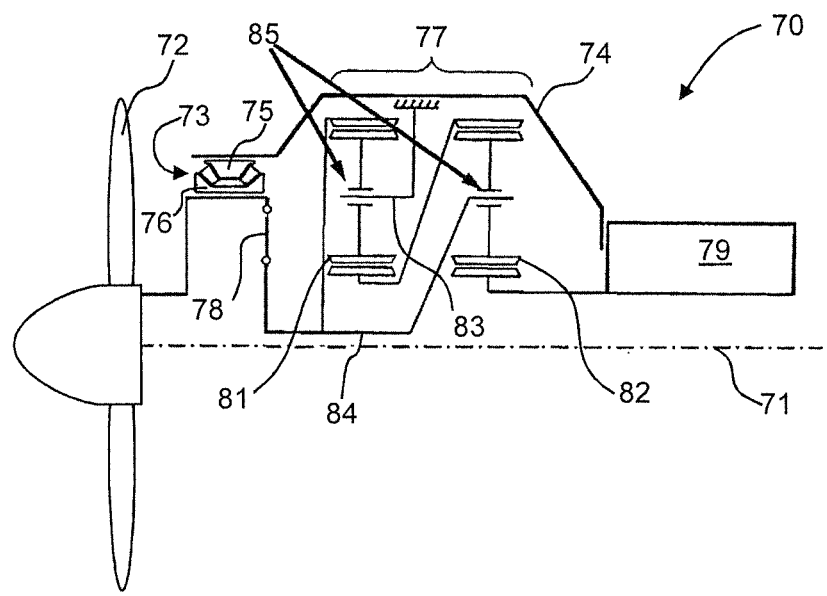
FIG. 13 illustrates schematically a wind turbine with epicyclic gear train and generator.

FIG. 13 illustrates schematically (and not to scale) a wind turbine installation (70) having an axis of rotation (71) about which a propeller blade (72) is mounted on a double row roller bearing (73). The roller rows of the bearing are arranged at an angle to the axis (71), and are opposed so as to resist thrust along the axis (71) in both directions.

A casing (74) supports the outer race (75) of the bearing (73), whereas the inner race (76) supports the propeller blade for rotation. A double epicyclic gear train (77) connects the propeller blade via a torque only coupling (78) to an electrical generator (79) (typically hollow about the axis 71). The overall gear ratio of the epicyclic gear train is in the range 1:20 to 1:30.

Respective planet gear wheels (81, 82) are provided for relative rotation on planet carriers (83, 84). The necessary bearings (85) are susceptible of high static loadings when the propeller blade is stationary, and at these locations the invention provides a compact and convenient way of advancing the highly loaded circumferential portions thereof.

In an embodiment of the wind turbine installation, pressure is applied to actuate the advancing mechanism, but movement of the corresponding race may be prevented whilst the bearing is under load. However, as the planet wheels rotate about the axis (71), they will each reach a low load condition in which point the normally fixed race will move through an increment.

It will be appreciated that the cyclical loading of the planet wheel bearings can be used to advantage, so that the actuation force of the advancing mechanism need be no higher than the force to rotate the normally fixed race in the minimum load condition. It will also be appreciated that timing of the pressure pulse is not critical, because the bearing race will move automatically at the low load condition provided that pressure is applied in advance.

By monitoring the pressure in actuation line (51), a diagnostic can be provided to confirm movement of the normally fixed race. Thus a pressure drop can be expected as the pistons (32, 33) move apart, which can be compared with a known response for full stroke of the advancing mechanism. The speed of change of pressure may also provide a qualitative indication of deterioration of the mechanism or bearing—for example a relatively slow fall in pressure may indicate sticking or jamming of the components, and perhaps give a forewarning that maintenance is necessary.

Although this invention has been described with particular reference to wind turbines, it is useful wherever high static or bending loads are continuously or repeatedly transmitted via a fixed portion of a bearing race. Heavy duty applications such as steel rolling mills and power generation machinery are examples where the invention has application.

In this invention, the skilled man will select a rotary actuator dependent upon the torque which is required to move the normally fixed bearing element. That in turn will depend on the fit of the bearing element on or in its neighbouring element. The difference between the load for incremental movement of the bearing element and the rotational forces of re-setting is at least an order of magnitude and the skilled man will have no difficulty in making the necessary calculations, which are in any event dependent on the circumstances of each bearing installation. Although described in relation to a rolling element bearing, the invention is also applicable to a plain bearing comprising a cylindrical bushing.

The invention claimed is:

1. A rotary mechanism for incrementally advancing a bearing race with respect to a hub, the bearing race and hub being engaged with resistance to relative angular movement with one another, the rotary mechanism comprising:

a circular actuator rotationally fixed to the bearing race and having a support ring configured to be coupled via a circular sprag assembly to the hub,
wherein said actuator is configured to generate a torque sufficient to advance said bearing race arcuately with respect to the hub in a locked condition of said circular sprag assembly,
and said support ring is adapted to advance relative to said hub on release of said actuator in an unlocked condition of said circular sprag assembly.

2. The mechanism of claim 1, wherein said circular actuator comprises a plurality of identical hydraulic actuators arranged circumferentially about said support ring.

3. The mechanism of claim 2, wherein said hydraulic actuators, said support ring and said circular sprag assembly are substantially co-planar.

4. The mechanism of claim 2, wherein each of said hydraulic actuators comprise a piston engaged with said support ring and movable arcuately in a respective chamber defined by an actuator housing, said actuator housing being coupled to said in bearing race.

5. The mechanism of claim 4, wherein said actuator housing defines therein an annular chamber passage of constant cross-section, each chamber being constituted by a portion of said annular chamber.

6. The mechanism of claim 5, wherein said actuator housing defines a plurality of slots at a radially inner side thereof through which respective pistons engage with said support ring.

7. The mechanism of claim 6, wherein a circumferential dimension of said slots defines a maximum incremental advance of said mechanism.

8. The mechanism of claim 6, wherein said support ring includes a plurality of radial projections for engagement one each in a respective slot of said plurality of slots.

9. The mechanism of claim 4, wherein said actuator housing comprises facing annular components, one of said facing annular components providing a hydraulic connection to a respective chamber.

10. The mechanism of claim 9, wherein the other of said facing annular components provides a lubrication connection for said bearing race.

11. The mechanism of claim 1, wherein said actuator is advanced against a return bias, which provides a re-setting force thereof.

12. The mechanism of claim 1 mounted to one side of a rolling element bearing having inner and outer bearing races, wherein said bearing race comprises one of said inner and outer races, and the hub comprises a ground member of said bearing.

* * * * *